United States Patent
Kang et al.

(10) Patent No.: US 9,503,348 B2
(45) Date of Patent: Nov. 22, 2016

(54) APPARATUS AND METHOD OF CONTROL POINT FOR DEVICE DISCOVERY

(71) Applicant: Samsung Electronics Co., Ltd, Gyeonggi-do (KR)

(72) Inventors: Pil-Seob Kang, Gyeonggi-do (KR); Seong-Il Hahm, Gyeonggi-do (KR); Woo-Jin Park, Gyeonggi-do (KR); Hun-Je Yeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 13/756,190

(22) Filed: Jan. 31, 2013

(65) Prior Publication Data

US 2013/0198283 A1    Aug. 1, 2013

(30) Foreign Application Priority Data

Jan. 31, 2012 (KR) .................. 10-2012-0009762

(51) Int. Cl.
*H04L 12/26* (2006.01)

(52) U.S. Cl.
CPC .......... *H04L 43/10* (2013.01); *H04L 43/0811* (2013.01)

(58) Field of Classification Search
CPC ............................. H04L 12/26; H04L 43/10
USPC ....................................................... 709/204
See application file for complete search history.

(56) References Cited

U.S. PATENT DOCUMENTS

| | | | |
|---|---|---|---|
| 6,445,234 B1 * | 9/2002 | Yoon et al. | 327/161 |
| 6,920,123 B1 | 7/2005 | Shin et al. | |
| 2007/0079362 A1 | 4/2007 | Lortz et al. | |
| 2008/0159162 A1 * | 7/2008 | Morikuni et al. | 370/252 |
| 2009/0161547 A1 * | 6/2009 | Riddle et al. | 370/236 |
| 2010/0002611 A1 | 1/2010 | Umatt et al. | |
| 2011/0013558 A1 * | 1/2011 | Chang | 370/328 |
| 2013/0124730 A1 * | 5/2013 | Buerk | H04L 69/28 709/225 |

OTHER PUBLICATIONS

UPnP Forum, UPnP Device Architecture 1.0, Oct. 15, 2008, pp. 10-44.*
Mills, K; Dabrowski, C., Adaptive jitter control for UPnP M-search, Communications, 2003. ICC '03. IEEE International Conference on (vol. 2 ), pp. 1008-1013 vol. 2.*
International Search Report dated May 15, 2013 in connection with International Application No. PCT/KR2013/000680, 3 pages.
Written Opinion of the International Searching Authority dated May 15, 2013 in connection with International Application No. PCT/KR2013/000680, 6 pages.

* cited by examiner

*Primary Examiner* — Kamal Divecha
*Assistant Examiner* — Meriam Abisourour (57) ABSTRACT

An operating method of a control point includes setting a Maximum time for waits (MX) value for device discovery. The method also includes transmitting a message that includes the set MX value to at least one device connected with the control point. The method further includes receiving a response message in response to a Method for Search Request (M-SEARCH) message from the at least one device.

4 Claims, 9 Drawing Sheets

APPARATUS AND METHOD OF CONTROL POINT FOR DEVICE DISCOVERY

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jan. 31, 2012, and assigned Serial No. 10-2012-0009762, the entire disclosure of which is hereby incorporated by reference.

TECHNICAL FIELD OF THE INVENTION

The present disclosure relates generally to an apparatus and a method of control point for device discovery.

BACKGROUND OF THE INVENTION

As network systems advance, various devices installed in the house or the office can be used through wireless or wired connection. For example, by use of Universal Plug and Play (UPnP), a Personal Computer (PC), a terminal, and a smart television in the house can share data to simplify home network functions.

In such a home network, a control point can receive a notification message from each individual device and detect every device connected to the network. For example, the control point detects the connection status of each device by multicasting a Method for Search Request (M-SEARCH) message to every device on the network and receiving a response message such as an alive message and a byebye message, from each device in reply to the M-SEARCH message.

However, since the M-SEARCH message transmitted from the conventional control point to the device and the response message in response to the M-SEARCH message transmitted from the device to the control point are transmitted only once, packets are frequently lost. As a result, the control point may not be able to discover some devices that actually exist in the network.

The notification message includes a maximum time for waits (MX) value. The MX value relates to a response time when the device sends the notification message to the control point. With a fixed MX value, the related art cannot reflect the actual network environment. For example, the fixed response time is used regardless of the number of the devices in the network. The response time is lengthened even with the small number of the devices. Consequently, it takes more time for the control point to detect the connection status of the device in the network.

SUMMARY OF THE INVENTION

To address the above-discussed deficiencies of the prior art, it is a primary aspect of the present disclosure to provide an apparatus and a method for generating a M-SEARCH message based on current network condition so that a user can search for a device stably and rapidly.

Another aspect of the present disclosure is to provide an apparatus and a method for providing a reliable search result using device list management based on a device search history.

In accordance with an aspect of the present invention, a method of operating a control point is provided. The method includes setting a Maximum time for waits (MX) value for device discovery, transmitting a message comprising the set MX value to at least one device connected with the control point and receiving a response message in response to a Method for Search Request (M-SEARCH) message from the at least one device.

In an exemplary embodiment of the present invention, the response message indicates a connection status of each device and is received from the at least one device within a certain time in a range of the set MX value.

In an exemplary embodiment of the present invention, the setting of the MX value for the device discovery comprises determining whether the device discovery is initially conducted and upon a determination that the device discovery is initially conducted, setting the MX value to a first set value.

In an exemplary embodiment of the present invention, the method further includes upon a determination that the device discovery is not initially conducted, comparing the number of stored services and a set number and when the number of the stored services is greater than the set number, setting the MX value to the first set value.

In an exemplary embodiment of the present invention, the method further includes when the number of the stored services is smaller than the set number, setting the MX value to a second value which is smaller than the first set value.

In an exemplary embodiment of the present invention, the number of stored services is provided by each device connected with the control point and varies according to a type of the device.

In an exemplary embodiment of the present invention, the method further includes upon a determination that the device discovery is not initially conducted, comparing a time difference of a current device discovery execution and a last device discovery execution with a sum of the stored MX value and a predetermined time and when the time difference is smaller than the sum of the stored MX value and the predetermined time, setting the MX value to the first set value.

In an exemplary embodiment of the present invention, the method further includes when the time difference is greater than the sum of the stored MX value and the predetermined time, setting the MX value to a second value which is smaller than the first set value.

In accordance with an aspect of the present invention, a method of operating a control point is provided. The method includes discovering a device by setting, a Maximum time for waits (MX) value to a predetermined value updating a device list by applying an execution result and determining whether the updated device list comprises an undiscovered device.

In an exemplary embodiment of the present invention, the method further includes when the device list comprises an undiscovered device, comparing the number of the device discovery executions and a predetermined number.

In an exemplary embodiment of the present invention, the method further includes when the number of the device discovery executions is smaller than the predetermined number: (1) discovering the device in the background by increasing the MX value which is set to the predetermined value by a second predetermined value (2) updating the device list by applying an execution result of the device discovery in the background and determining whether the updated device list comprises an undiscovered device.

In an exemplary embodiment of the present invention, the method further includes when the updated device list comprises an undiscovered device in the operation (3), comparing the number of device discovery executions and the predetermined number and when the number of device discovery executions is smaller than the predetermined number, repeating the operations (1), (2) and (3).

In accordance with another aspect of the present invention, a method of operating a control point is provided. The method includes comparing a first device list generated from the device discovery execution and a second device list generated last before the first device list determining whether the first device list comprises an undiscovered device and when the first device list comprises an undiscovered device, processing a device list management algorithm.

In an exemplary embodiment of the present invention, the method further includes determining whether the second device list is stored and when it is determined that the second device list is not stored, updating the device list.

In an exemplary embodiment of the present invention, the method further includes when the first device list does not comprise the undiscovered device, updating the device list.

In an exemplary embodiment of the present invention, the step of processing the device list management algorithm comprises determining whether a calculated value exceeds a predetermined reference value and when the calculated value exceeds the predetermined reference value, deleting the undiscovered device from the second device list.

In an exemplary embodiment of the present invention, the method further includes updating the second device list.

In an exemplary embodiment of the present invention, the calculated value is a sum of a product of a first value and a second value, and a third value.

In an exemplary embodiment of the present invention, the first value indicates a time difference between a current device discovery and a last device discovery, the second value indicates the number of device discovery failures, and the third value indicates the calculated value calculated last.

In accordance with still another aspect of the present invention, a method of operating a control point is provided. The method includes receiving a first message from a control point connected with the device and transmitting a response message in response to a Method for Search Request (M-SEARCH) message corresponding to the first message, to the control point.

In an exemplary embodiment of the present invention, the response message comprises a Maximum time for waits (MX) value which is set by the control point.

In an exemplary embodiment of the present invention, the first message indicates a connection status of the device and is transmitted to the control point within a predetermined time in a range of the MX value which is set by the control point.

According to yet another exemplary aspect of the present invention, the apparatus includes a controller configured to set a Maximum time for waits (MX) value for device discovery and a communication module predetermined transmit a message comprising the set MX value to at least one device connected with the control point, and receive a response message in response to a Method for Search Request (M-SEARCH) message from the at least one device.

In an exemplary embodiment of the present invention, the response message indicates a connection status, of each device and is received from the at least one device within a certain time in a range of the set MX value.

In an exemplary embodiment of the present invention, the controller determines whether the device discovery is initially conducted, and sets the MX value to a first set value upon a determination that the device discovery is initially conducted.

In an exemplary embodiment of the present invention, upon a determination that the device discovery is not initially conducted, the controller compares the number of stored services and a set number and sets the MX value to the first set value when the number of the stored services is greater than the set number.

In an exemplary embodiment of the present invention, when the number of the stored services is smaller than the set number, the controller sets the MX value to a second value which is smaller than the first set value.

In an exemplary embodiment of the present invention, the number of stored services is provided by each device connected with the control point and varies according to a type of the device.

In an exemplary embodiment of the present invention, upon a determination that the device discovery is not initially conducted, the controller compares a time difference of a current device discovery execution and a last device discovery execution with a sum of the stored MX value and a predetermined time, and sets the MX value to the first set value when the time difference is smaller than the sum of the stored MX value and the predetermined time.

In an exemplary embodiment of the present invention, when the time difference is greater than the sum of the stored MX value and the predetermined time, the controller sets the MX value to a second value which is smaller than the first set value.

According to yet another exemplary aspect of the present invention, the apparatus includes a controller configured to discover a device by setting a Maximum time for waits (MX) value to a predetermined value, update a device list by applying an execution result, and determine whether the updated device list comprises an undiscovered device and a storage configured to store data controlled by the controller.

In an exemplary embodiment of the present invention, when the device list comprises an undiscovered device, the controller compares the number of the device discovery executions and a predetermined number.

In an exemplary embodiment of the present invention, when the number of the device discovery executions is smaller than the predetermined number, the controller (1) discovers the device in the background by increasing the MX value which is set to the predetermined value by a second predetermined value, (2) updates the device list by applying an execution result of the device discovery in the background, and (3) determines whether the updated device list comprises an undiscovered device.

In an exemplary embodiment of the present invention, when the updated device list comprises an undiscovered device, the controller compares the number of device discovery executions and the predetermined number and repeats the operations (1), (2) and (3) when the number of the device discovery executions is smaller than the predetermined number.

According to yet another exemplary aspect of the present invention, the apparatus includes a controller configured to compare a first device list generated from the device discovery execution and a second device list generated last before the first device list, determine whether the first device list comprises an undiscovered device, and process a device list management algorithm when the first device list comprises an undiscovered device and a storage configured to store data controlled by the controller.

In an exemplary embodiment of the present invention, the controller determines whether the second device list is stored, and updates the device list when it is determined that the second device list is not stored.

In an exemplary embodiment of the present invention, when the first device list does not comprise the undiscovered device, the controller updates the device list.

In an exemplary embodiment of the present invention, the controller determines whether a calculated value exceeds a predetermined reference value, and deletes the undiscovered device from the second device list when the calculated value exceeds the predetermined reference value.

In an exemplary embodiment of the present invention, the controller updates the second device list.

In an exemplary embodiment of the present invention, the calculated value is a sum of a product of a first value and a second value, and a third value.

In an exemplary embodiment of the present invention, the first value indicates a time difference between a current device discovery and a last device discovery, the second value indicates the number of device discovery failures, and the third value indicates the calculated value calculated last.

According to yet another exemplary aspect of the present invention, the apparatus includes a communication module configured to receive a message from a control point connected with the device and transmit a response message in response to a Method for Search Request (M-SEARCH) message corresponding to the first message, to the control point and a controller configured to control operations of the device.

In an exemplary embodiment of the present invention, the response message comprises a Maximum time for waits (MX) value which is set by the control point.

In an exemplary embodiment of the present invention, wherein the response message indicates a connection status of the device and is transmitted to the control point within a predetermined time in a range of the MX value which is set by the control point.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
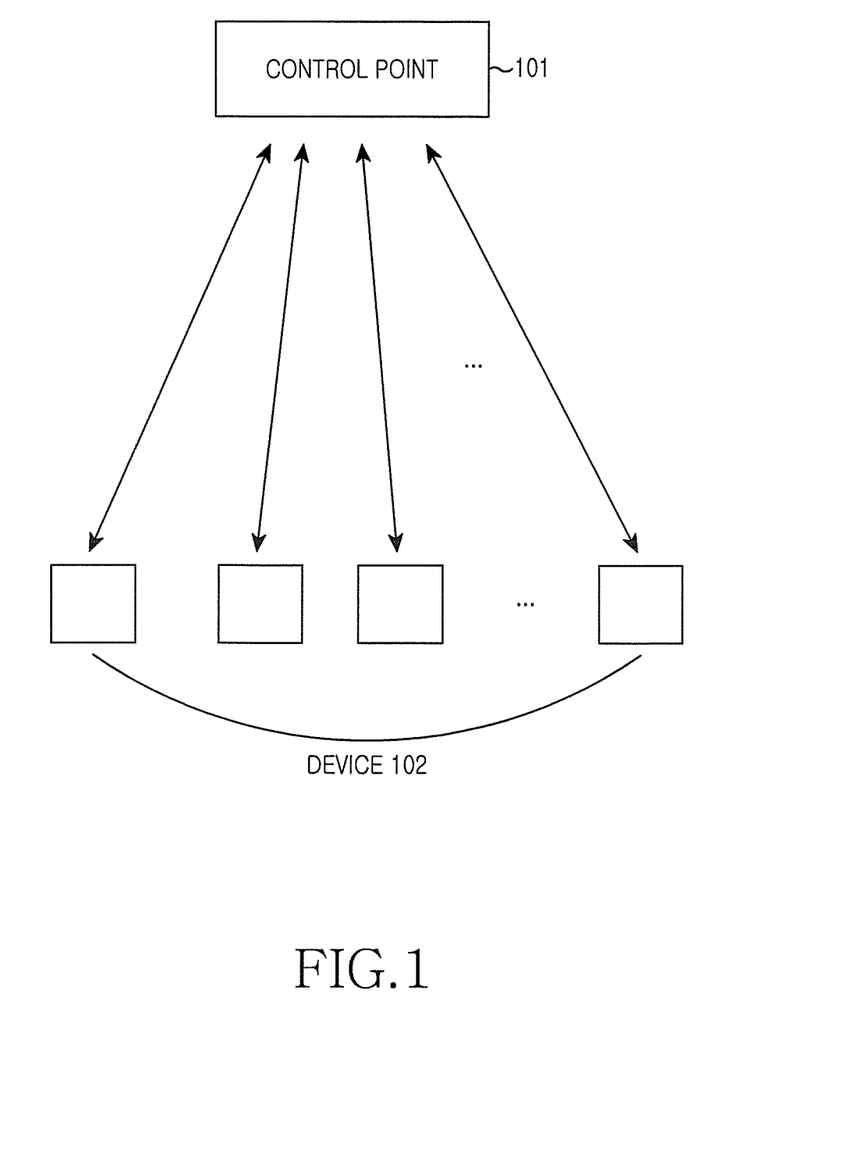
FIG. 1 is a diagram of a control point and a device according to an embodiment of the present disclosure.

FIG. 1 depicts a control point and a device according to an embodiment of the present disclosure. As shown in FIG. 1, a network system can include a control point 101 and at least one device 102.

The control point 101 is connected to the at least one device 102 in the network system, and checks the connection status of the device 102. That is, the control point 101 can examine the connection status of each device 102 in the network by sending a Method for Search Request (M-SEARCH) message to the device 102 in the network and then receiving a response message in response to the M-SEARCH message from the device 102.

The M-SEARCH message is sent from the control point 101 to each device 102 so as to examine the connection status of the device 102, and includes a Maximum time for waits (MX) value relating to the response message transmission time of the device 102. Herein, the MX value is a value selected by a user, manager, operator, or the like among integers 1~120. The device 102 receiving the M-SEARCH message including the MX value sends the response message to the M-SEARCH message to the control point 101 based on the MX value. For example, it is assumed that the control point 101 sends the M-SEARCH message including the MX value '60' to each device 102. The device 102 receiving the M-SEARCH message from the control point 101 can confirm that the MX value of the M-SEARCH message is set to 60. The device 102 confirming the MX value set to 60 randomly selects any one of times ranging from 0 to 60 and sends a notification message to the control point 101. Hence, the MX value is related to the time of the device 102 sending the response message to the M-SEARCH message. That is, as the MX value approaches zero among the integers 0~120, the device 102 sends the notification message to the M-SEARCH message to the control point 101 relatively rapidly. Conversely, as the MX value approaches 120, the device 102 sends the notification message to the control point 101 relatively slowly.

In the related art, the user fixes the MX value and accordingly the current network environment is not reflected. More specifically, the fixed MX value is used regardless of the number of the devices in the network, and the actual network environment is not reflected. For example, when the fixed MX value is relatively large even with the small number of the devices in the network, the control point 101 receives the notification message late from the device and the efficiency of the network system is degraded. However, the present disclosure provides two algorithms for setting the MX value so as to offer the efficiency to the user by reflecting the actual network environment.

The response message to the M-SEARCH message is transmitted from each device 102 of the network to the control point 101, and includes the current connection status of the device 102. In more detail, the device 102 receives the M-SEARCH message from the control point 101 and transmits its connection status to the control point 101 when the device 102 accesses, uses, or disconnects from the network. For example, when the device 102 is connected to the network and the M-SEARCH message is received from the control point 101, the device 102 sends the alive message indicating the current network connection and the current use to the control point 101. When the device 102 is disconnected from the network, the device 102 sends the byebye message indicating the network disconnection to the control point 101. Thus, the control point 101 can receive the response message to the M-SEARCH message from the device 102 and detect the connection status of each device 102.

The device 102 is defined as any device operating in the network. More specifically, at least one device 102 on the network is connected to the control point 101 to transmit its current connection status to the control point 101 using the notification message. First, the device 102 on the network receives the M-SEARCH message from the control point 101. Next, the device 102 confirms the MX value in the M-SEARCH message received from the control point 101 and sends the response message to the MX M-SEARCH message reflecting the MX value to the control point 101. In the related art, the user fixes the MX value and accordingly the current network environment is not reflected. However, the present disclosure does not apply the fixed MX value but flexibly changes the MX value based on the actual network environment to thus provide the efficiency to the user.

Figure 2A:
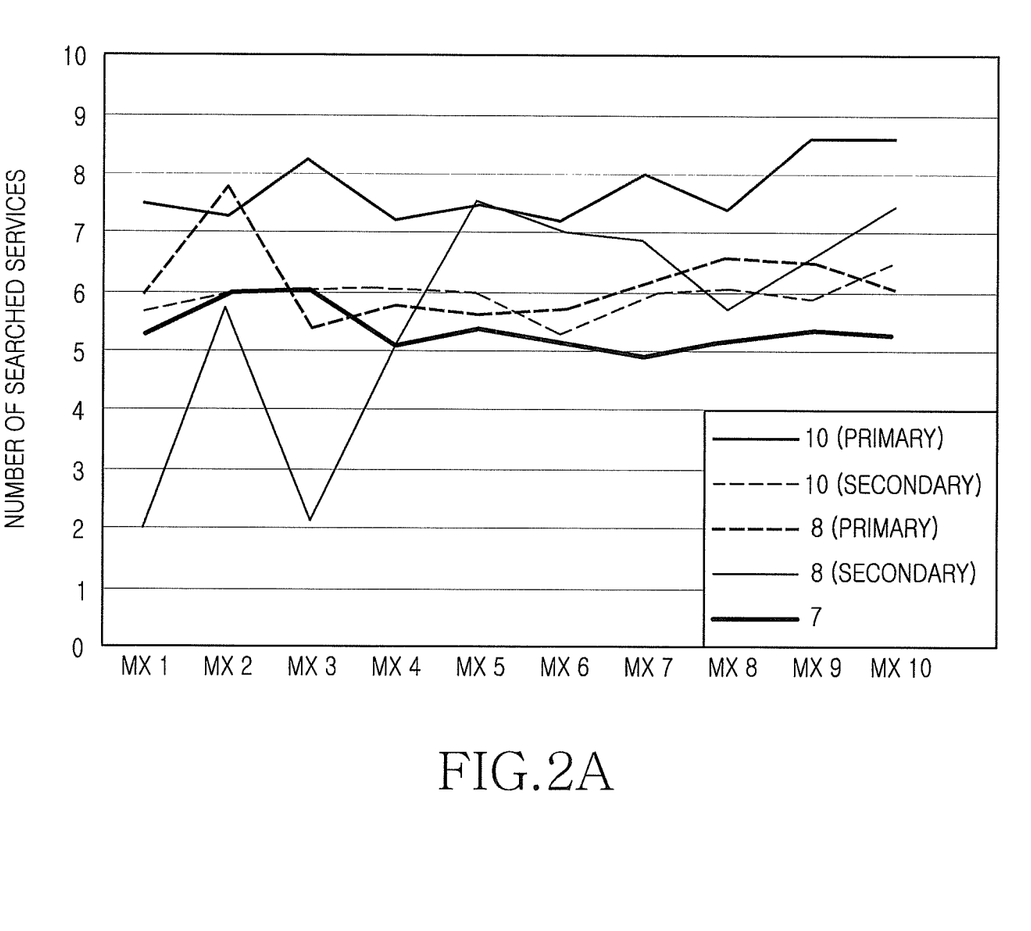
FIGS. 2A and 2B are graphs of test results of an adequate MX value according to the number of services connected to the network according to an embodiment of the present disclosure.
Figure 2B:
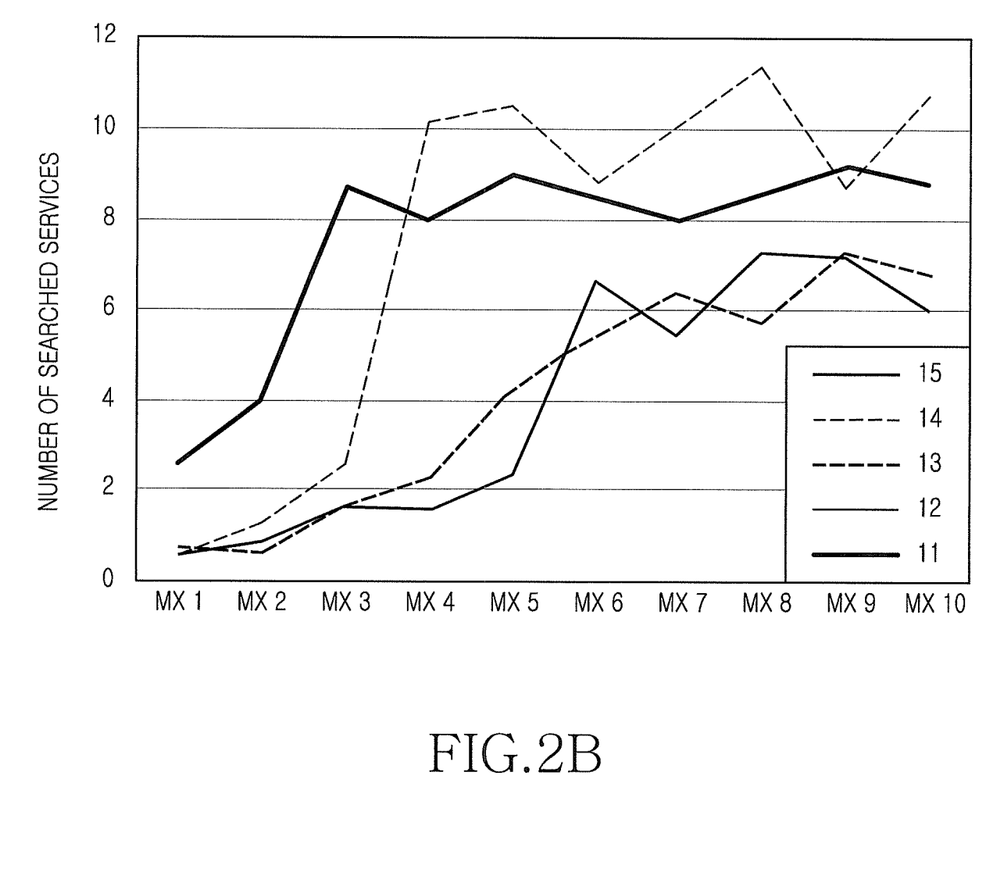

FIGS. 2A and 2B are graphs of test results for acquiring an adequate MX value according to the number of services connected to the network according to an embodiment of the present disclosure. A terminal, a PC, and a television are tested. In this test, the terminal provides one service, the PC provides two services, and the television provides four services. To acquire an approximate average value, ten tests are conducted. Herein, the x axis indicates the MX value and the y axis indicates the total number of the services provided by the device discovered by the control point on the network.

FIG. 2A shows the number of the searched services as the MX value increases when the number of the services searched by the control point does not exceed 10. As shown in FIG. 2A, when the total number of the services offered by the device on the network does not exceed 10, the slope of the graph is relatively slight. More specifically, when the total number of the services offered by the device on the network is smaller than 10, the graph is flat and not greatly affected by the MX set value. That is, when the number of the devices in the network is small, it is efficient to shorten the feedback time of the control point from each device by setting a small MX value and without having to set a large MX value.

FIG. 2B shows the number of the searched services as the MX value increases when the number of the services searched by the control point exceeds 10. As shown in FIG. 2B, when the total number of the services offered by the device on the network exceeds 10, the slope of the graph is relatively steep. More specifically, when the total number of the services offered by the device on the network is greater than 10, the slope of the graph is steep and affected more or less by the MX set value. That is, when the number of the devices in the network is large, it is beneficial to set the MX value larger than a certain value to prevent the simultaneous transmission of the notification messages from the device to the control point. However, MX values over a certain value may not be efficient, as shown in FIG. 2B. That is, when the MX value is too large with many devices in the network, it takes more time for the control point to receive the response message to the M-SEARCH message from each device to thus deteriorate the efficiency.

Based on the test of FIGS. 2A and 2B, it is concluded that it is more efficient to apply the MX value suitable for the user's network than using the fixed MX value in order to discover the device. Hence, in the related art, the user fixes the MX value and accordingly the current network environment is not reflected. By contrast, the present disclosure does not apply the fixed MX value but flexibly changes the MX value based on the actual network environment to thus provide the efficiency to the user.

Figure 3:
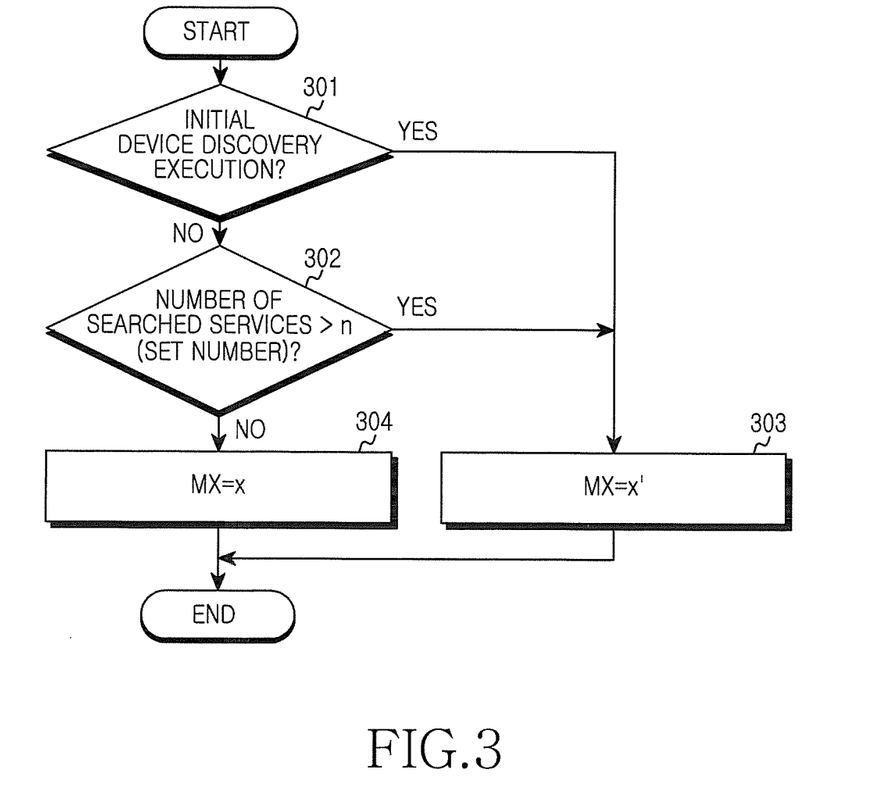
FIG. 3 is a flowchart of an algorithm for setting the MX value in the control point to discover a device according to an embodiment of the present disclosure.

FIG. 3 is a flowchart of an algorithm for setting the MX value in the control point to discover the device according to an embodiment of the present disclosure. As shown in FIG. 3, before the device discovery, the control point determines whether it is the initial device discovery execution in block 301. In further detail, since the present disclosure applies a flexible MX value reflecting the actual network environment, rather than applying a fixed MX value, it is beneficial to set the MX value suitable for the current network environment. Thus, according to the present algorithm, the control point first determines whether it is the initial discovery execution, prior to the discovery execution.

When the discovery operation to be executed by the control point is not the initial discovery operation, the control point determines whether the number of searched services is greater than a certain number defined by the user in block 302. Herein, the number of services, which is provided by each device connected to the control point, varies according to a device type. More specifically, the number of the services provided to the control point can vary according to the type of devices on the network. For example, it is assumed that the terminal can offer one service, the PC can offer two services, and the television can offer four services. The network includes four terminals, seven PCs, and two televisions. In this example, the control point can confirm 26 services in total. Next, the control point confirming 26 services of the devices on the network compares with 24, which is the certain number set by the user.

When the number of services searched by the control point is greater than the certain number set by the user, the control point sets the MX value to a value x' set by the user in block 303 and finishes this process. In this example, the control point confirming the 26 services offered by the device on the network compares it with the number 24 set by the user, sets the MX value to x' since the number of the searched services is greater by two. The control point then finishes this process.

When the number of services searched by the control point is smaller than the certain number set by the user in the determination of block 302, the control point sets the MX value to a value x set by the user in block 304 and finishes this process. For example, upon confirming 20 services offered by the device on the network, the control point compares 20 with the certain number 24 set by the user, and sets the MX value to the x since the number of the searched services is smaller by four. The control point finishes this process. Herein, the present algorithm defines that the value x' is greater than the value x, which are set by the user.

When determining the initial device discovery operation in block 301, the control point sets the MX value to the value x' in block 304 and finishes this process.

Figure 4:
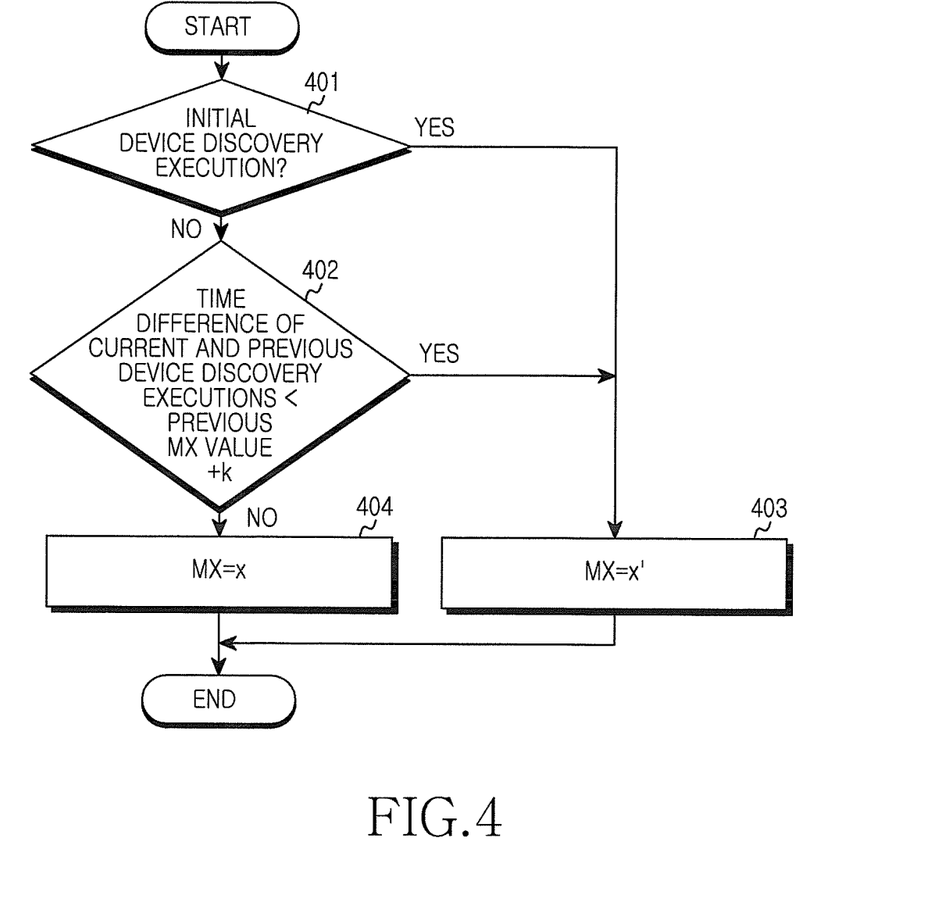
FIG. 4 is a flowchart of an algorithm for setting the MX value in the control point to discover the device according to another embodiment of the present disclosure.

FIG. 4 is a flowchart of an algorithm for setting the MX value in the control point to discover the device according to another embodiment of the present disclosure. As shown in FIG. 4, before discovering the device, the control point determines whether it is the initial device discovery execution in block 401. In further detail, since the present disclosure applies the flexible MX value reflecting the actual network environment, rather than applying the fixed MX value, it is necessary to set the MX value suitable for the current network environment. Thus, according to the present algorithm, the control point first determines whether it is the initial discovery execution, prior to the discovery execution.

When the discovery operation to be executed by the control point is not the initial discovery operation, the control point determines whether a time difference of the current and previous device discovery executions is smaller than the sum of the previous MX value and a certain time k set by the user in block 402. Herein, the execution time of the current device discovery indicates the current device discovery execution time of the control point. The execution time of the previous device discovery indicates the last device discovery execution time before the current device discovery of the control point. The previous MX value is the MX value stored to the control point; that is, the previous MX value is defined as the last MX value stored to the control point. In block 402, the control point calculates the time difference between the current device discovery execution and the last device discovery execution ahead of the current discovery. Next, the control point determines whether the time difference is smaller than the sum of the previous MX value and the certain time k set by the user.

When the time difference of the current and previous device discovery executions is smaller than the sum of the previous MX value and the certain time k set by the user in block 402, the control point sets the MX value to x' in block 403 and finishes this process. For example, when the time difference of the current and previous device discovery executions is 60 and the sum of the previous MX value and a certain time k set by the user is 65, the control point sets the MX value to the x' and finishes this process.

When the time difference of the current and previous device discovery executions is greater than the sum of the previous MX value and the certain time k set by the user in block 402, the control point sets the MX value to the x in block 404 and finishes this process. For example, when the time difference of the current and previous device discovery executions is 60 and the sum of the previous MX value and the certain time k set by the user is 58, the control point sets the MX value to x and finishes this process.

When determining the initial device discovery operation to be executed by the control point in block 401, the control point sets the MX value to the value x in block 403 and finishes this process.

Figure 5:
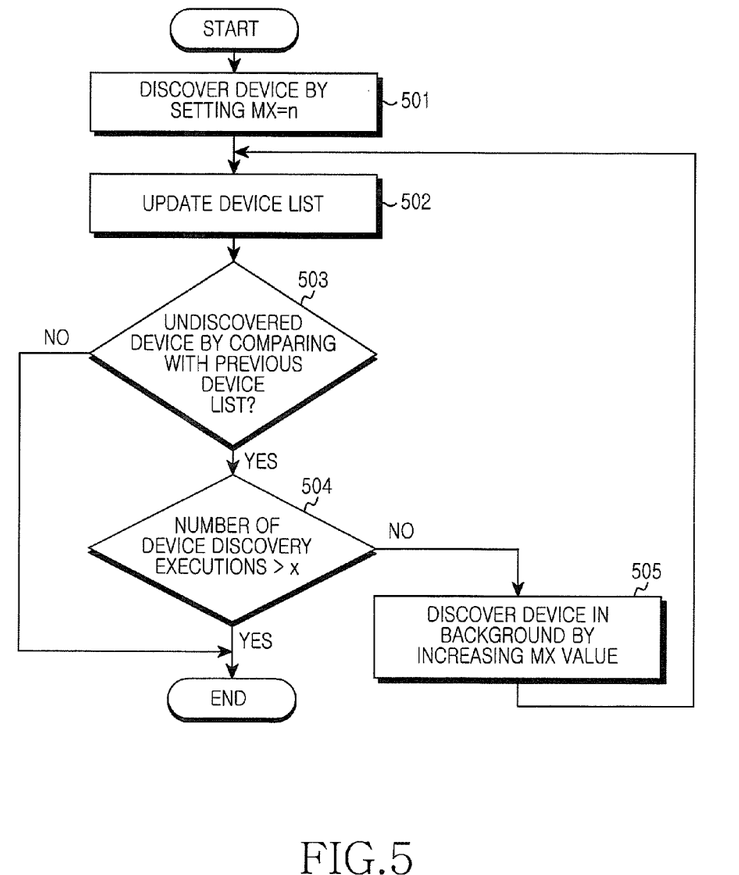
FIG. 5 is a flowchart of a device list management algorithm according to an embodiment of the present disclosure.

FIG. 5 is a flowchart of a device list management algorithm according to an embodiment of the present disclosure. As shown in FIG. 5, the control point discovers the device by setting the MX value to a certain value n set by the user in block 501. The present algorithm is executed to determine whether there is any device not discovered by the control point on the network. That is, while the primary purpose of the algorithms of FIGS. 3 and 4 is to set the MX value suitable for the network environment, the present algorithm aims at discovering, the device, rather than the MX value, not discovered by the control point in the network. As aforementioned, upon receiving the M-SEARCH message from the control point, each device sends the response message to the M-SEARCH message to the control point just once. Thus, when the control point sends the M-SEARCH message to the device or when the device sends the response message to the M-SEARCH message to the control point, the control point may not discover the device in the network because of packet loss. That is, the present algorithm provides the device list management method using the search history.

After discovering the device by setting the MX value to the certain value n set by the user, the control point updates a device list in block 502. In detail, the control point sets the MX value to the certain value n set by the user and sends the M-SEARCH message including the MX value to each device. Next, the device receiving the M-SEARCH message from the control point confirms the MX value in the response message to the M-SEARCH message and sends to the control point the response message to the M-SEARCH message including its current connection status within a certain time in the MX value range. The control point receiving the response message to the M-SEARCH message from the device updates the device list. Herein, the device list indicates a list including information of every device connected in the network. More specifically, the device list includes the type and the number of the devices detected by the current control point on the network. Accordingly, based on the device list, the user can determine whether there is any device currently connected but not detected by the control point.

In block 503, the control point determines whether there is an undiscovered device by comparing with a previous device list. In detail, in block 502, the control point searches for the device on the network, updates a new device list, and then determines whether there is an undiscovered device by comparing with the previous device list stored last to the control point.

When determining the undiscovered device by comparing the newly updated device list and the previous device list, the control point determines whether the number of device discovery executions is smaller than a certain number of times in block 504. In detail, the control point compares the number of device discovery executions and the certain number of times set by the user. Herein, the number of device discovery executions indicates the total number of the device discovery executions of the control point.

When the number of device discovery executions of the control point is smaller than the certain number of times set by the user, the control point discovers the device in the background by increasing the MX value in block 505. More specifically, upon determining that the number of device discovery executions of the control point is smaller than the certain number of times set by the user, the control point discovers the device in the background by increasing the MX value from the value n (which is the initial MX value) by the value set by the user. Hence, the number of the device discovery executions increases more. After discovering the device by increasing the MX value, the control point repeats the blocks 505, 502 and 503 until the number of the device discovery executions exceeds the certain number of the times set by the user.

When discovering no device unsearched in the current device list, the control point finishes this process. Also, when the number of device discovery executions is greater than the certain number of times set by the user, the control point finishes this process.

Figure 6:
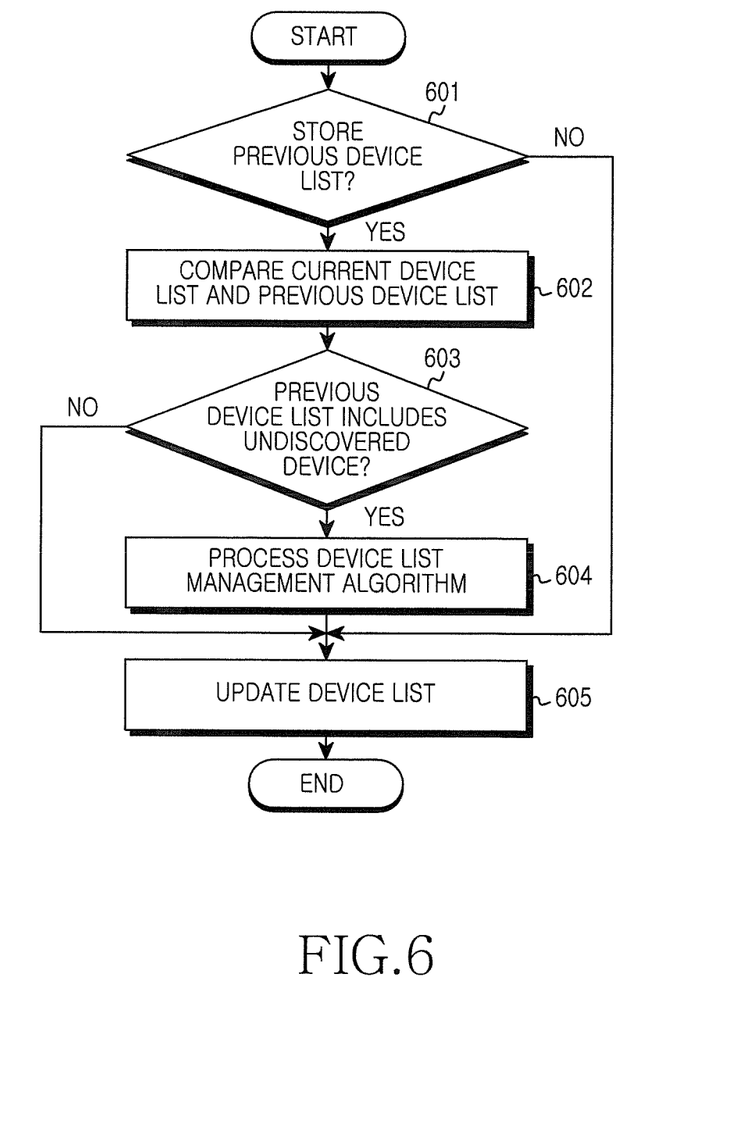
FIG. 6 is a flowchart of the device list management algorithm according to another embodiment of the present disclosure.

FIG. 6 is a flowchart of the device list management algorithm according to another embodiment of the present disclosure. As shown in FIG. 6, the control point determines whether the previous device list is stored in block 601. In detail, before the device discovery, the control point determines whether it performs the initial device discovery. That is, this algorithm relates to the device list management. When the control point stores the previous device list, it utilizes the list.

Before the device discovery, the control point, when storing the previous device list, compares the current device list and the previous device list in block 602. More specifically, after the current device discovery, the control point compares the current device list and the previous device list.

In block 603, the control point determines whether the previous device list includes the unsearched device. After discovering the device on the network in block 602, the control point updates the new device list and determines whether there is an undiscovered device by comparing with the previous device list stored last to the control point. For example, when the previous device list includes four terminals, three PCs, and two televisions as the devices on the network and the current device list includes four terminals, three PCs, and one television as the devices on the network, the control point can confirm that one television is abnormally terminated.

When determining the unsearched device by comparing the current device list and the previous device list, the control point carries out the device list management algorithm in block 604. For the device list management algorithm, the control point calculates a value F(x) based on Equation 1:

$$F(x) = \text{previous } F(x) + (\text{time interval between current and previous device search times}) * (\text{undiscovered times}) \quad [\text{Eqn. 1}]$$

where time interval between current and previous device search times denotes the time difference between the current device discovery and the last device discovery in the control point, undiscovered times denotes the number of the device discovery failures in the control point, and previous F(x) denotes the value of F(x) calculated last. For example, provided that previous F(x) is 4, time interval between current and previous device search times is 5, and undiscovered times is 10, F(x) is 54. Next, with the calculated F(x), the control point calculates the present device list management algorithm. More specifically, when the calculated F(x) does not exceed a reference value set by the user, the control point does not delete the undiscovered device from the devices of the previous device list. By contrast, when the calculated F(x) exceeds the reference value set by the user, the control point deletes the undiscovered device from the devices of the previous device list.

The control point updates the device list in block 605, and finishes this process. In detail, according to the calculated F(x) of the device list management algorithm in block 604, the control point updates the changed device list. For example, when the calculated F(x) does not exceed the reference value set by the user, the control point does not delete the undiscovered device from the devices of the previous device list.

When not storing the previous device list in block 601, the control point updates the device list in block 605 and finishes this process. When the previous device list does not include the undiscovered device in block 603, the control point updates the device list in block 605 and finishes this process.

Figure 7:
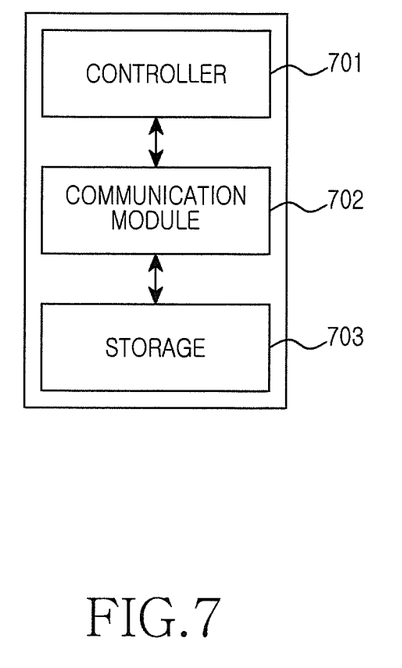
FIG. 7 is a block diagram of the control point according to an embodiment of the present disclosure.

FIG. 7 is a block diagram of the control point according to an embodiment of the present disclosure. As shown in FIG. 7, the control point can include a controller 701, a communication module 702, and a storage 703.

The controller 701 controls the operations of the control point. For example, the controller 701 sets the MX value for the device discovery, determines whether the device discovery is the initial execution, and sets the MX value to a first set value upon determining the initial execution. When determining no initial execution, the controller 701 compares the number of the stored services and the set number. When the number of the stored services is greater than the set number, the controller 701 sets the MX value to the first value. When the number of the stored services is smaller than the set number, the controller 701 sets the MX value to a second value which is smaller than the first value. When determining no initial execution, the controller 701 compares the time difference between the current device discovery and the last device discovery with the sum of the stored MX value and the certain time. When the time difference is smaller than the sum of the stored MX value and the certain time, the controller 701 sets the MX value to the first value. When the time difference is greater than the sum of the stored MX value and the certain time, the controller 701 sets the MX value to the second value which is smaller than the first value.

The controller 701 discovers the device by setting the MX value to a third value, updates the device list based on the execution result, and determines whether the updated device list includes a new device. Herein, the first value indicates the time difference between the current device discovery and the last device discovery, the second value indicates the number of device discovery failures, and the third value indicates a specific value calculated last. When determining that the device list includes the new device, the controller 701 compares the number of the device discovery executions and the set number. When the number of device discovery executions is smaller than the set number, the controller 701 (1) discovers the device in the background by increasing the MX value set to the third value by the set value, (2) updates the device list by applying the execution result of the device discovery in the background, and (3) determines whether the updated device list includes the new device. When the new device is included, the controller 701 compares the number of the device discovery executions and the set number. When the number of the device discovery executions is smaller than the set number, the controller 701 repeats the operations (1), (2) and (3).

By comparing the first device list generated from the device discovery execution and the second device list generated last before the first device list, the controller 701 determines whether the first device list includes the new device. When the first device list includes the new device, the controller 701 processes the device list management algorithm. The controller 701 determines whether the second device list is stored. When not storing the second device list, the controller 701 updates the device list. When the first device list does not include the new device, the controller 701 updates the device list. The controller 701 determines whether the specific value calculated exceeds the reference value. When the specific value calculated exceeds the reference value, the controller 701 deletes the newly discovered device from the first device list and updates the first device list.

The communication module 702 processes signals transmitted and received over an antenna for voice and data communication. For example, the communication module 702 sends the message including the set MX value to the at least one device connected to the control point, and receives the response message to the M-SEARCH message from the at least one device.

The storage 703 includes a program storage for storing a program to control the operations of the control point, and a data storage for storing data generating in the program execution. For example, the storage 703 stores data controlled by the controller 701.

As constructed above, the controller 701 can process the functions of the control point. The components are separately illustrated here to distinguish various functions of the present disclosure. In the actual product, the controller 701 can process all or part of the functions of the control point.

Figure 8:
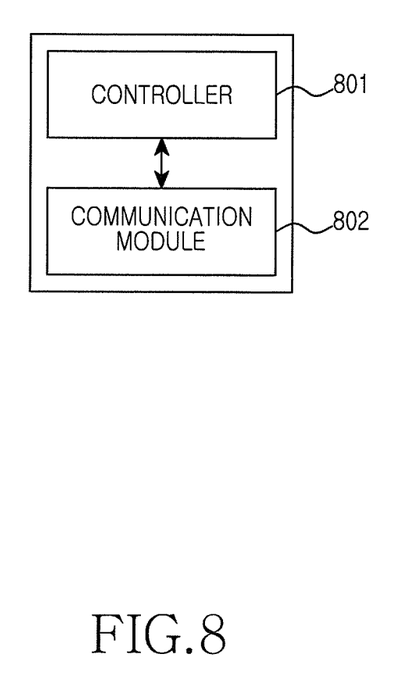
FIG. 8 is a block diagram of the device according to an embodiment of the present disclosure.

FIG. 8 is a block diagram of the device according to an embodiment of the present disclosure. As shown in FIG. 8, the device can include a controller 801 and a communication module 802.

The controller 801 controls the operations of the device.

The communication module 802 processes signals transmitted and received over an antenna for voice and data communication. For example, the communication module 802 receives the message from the control point connected with the device, and sends the notification message corresponding to the message to the control point.

As constructed above, the controller 801 can process the functions of the device. The components are separately illustrated here to distinguish various functions of the present disclosure. In the actual product, the controller 801 can process all or part of the functions of the device.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An operating method of a control point device, comprising:

setting, by the control point device, a Maximum time for waits (MX) value for device discovery;

transmitting, by the control point device, a Method for Search Request (M-SEARCH) message comprising the set MX value to at least one device connected with the control point device; and receiving, by the control point device, a response message in response to the M-SEARCH message from the at least one device, wherein the response message indicates a connection status of each device and is received from the at least one device within a certain time in a range of the set MX value; and wherein said setting the MX value for the device discovery comprises:

determining, by the control point device, whether a current device discovery is an initial device discovery, and upon a determination that the current device discovery is the initial device discovery, setting the MX value to a first set value, and upon a determination that the current device discovery is not the initial device discovery, comparing a difference between an execution time of the current device discovery and an execution time of a last device discovery with a sum of a pre-stored MX value and a predetermined time, and when the difference is smaller than the sum, setting the MX value to the first set value, and when the difference is greater than or equal to the sum, setting the MX value to a second set value that is smaller than the first set value, and wherein the execution time indicates from a transmission time of the M-SEARCH message to a reception time of a last response message for the M-SEARCH message.

2. An operating method of a device, comprising:

receiving, by the device, a Method for Search Request (M-SEARCH) message comprising a Maximum time for waits (MX) value from a control point device connected with the device; and transmitting, by the device, a response message in response to the M-SEARCH message, to the control point device, wherein the response message indicates a connection status of the device and is transmitted from the device within a certain time in a range of the MX value; and wherein the MX value is set, by the control point device, to a first set value when the current device discovery is an initial device discovery, and wherein the MX value is set, by the control point device, based on a comparison between a difference between an execution time of the current device discovery and an execution time of a last device discovery with a sum of a pre-stored MX value and a predetermined time when the current device discovery is not the initial device discovery, and wherein when the difference is smaller than the sum, the MX value is set to the first set value, and wherein when the difference is greater than or equal to the sum, the MX value is set to a second set value that is smaller than the first set value, and wherein the execution time indicates from a transmission time of the M-SEARCH message, by the control point device, to a reception time of a last response message for the M-SEARCH message, by the control point device.

3. An operating apparatus of a control point device, comprising:

a memory; and a communication unit; and a controller configured to:

determine whether a current device discovery is an initial device discovery, set a Maximum time for waits (MX) value to a first set value upon a determination that the current device discovery is the initial device discovery, compare a difference between an execution time of the current device discovery and an execution time of a last device discovery with a sum of a pre-stored MX value and a predetermined time upon a determination that the current device discovery is not the initial device discovery, set the MX value for device discovery to the first set value when the difference is smaller than the sum, set the MX value to a second set value that is smaller than the first set value when the difference is greater than or equal to the sum, transmit, via the communication unit, a Method for Search Request (M-SEARCH) message comprising the set MX value to at least one device connected with the control point device, and receive, via the communication unit, a response message in response to the M-SEARCH message from the at least one device, wherein the execution time indicates from a transmission time of the M-SEARCH message to a reception time of a last response message for the M-SEARCH message, and wherein the response message indicates a connection status of each device and is received from the at least one device within a certain time in a range of the set MX value.

4. An operating apparatus of a device, comprising:

a memory; and a communication unit; and a controller for receiving a Method for Search Request (M-SEARCH) message comprising a Maximum time for waits (MX) value from a control point device connected with the device, and transmitting a response message in response to the M-SEARCH message, to the control point device, wherein the response message indicates a connection status of the device and is transmitted from the device within a certain time in a range of the MX value, wherein the MX value is set, by the control point device, to a first set value when the current device discovery is a initial device discovery, wherein the MX value is set, by the control point device, based on a comparison between a difference between an execution time of the current device discovery and an execution time of a last device discovery with a sum of a pre-stored MX value and a predetermined time when the current device discovery is not the initial device discovery, wherein when the difference is smaller than the sum, the MX value is set to the first set value, wherein when the difference is greater than or equal to the sum, the MX value is set to a second set value which is smaller than the first set value, wherein the execution time indicates from a transmission time of the M-SEARCH message, by the control point device, to a reception time of a last response message for the M-SEARCH message, by the control point device.

* * * * *